United States Patent
Moon et al.

(10) Patent No.: US 9,242,230 B2
(45) Date of Patent: Jan. 26, 2016

(54) PROCESS FOR PREPARING COBALT BASED CATALYSTS FOR FISCHER-TROPSCH SYNTHESIS

(71) Applicant: KOREA INSTITUTE OF SCIENCE AND TECHNOLOGY, Seoul (KR)

(72) Inventors: Dong Ju Moon, Seoul (KR); Jae Sun Jung, Seoul (KR); Jae Suk Lee, Jeollanam-do (KR); Eun Hyeok Yang, Seoul (KR); Hyun Jin Kim, Seoul (KR); Bang Hee Kim, Seoul (KR); Seung Hwan Lee, Gyeonggi-do (KR); Yun Ju Lee, Incheon (KR); Ga Ram Choi, Chungcheongnam-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 346 days.

(21) Appl. No.: 13/971,204

(22) Filed: Aug. 20, 2013

(65) Prior Publication Data

US 2014/0349845 A1    Nov. 27, 2014

(30) Foreign Application Priority Data

May 22, 2013    (KR) .......................... 10-2013-0057994

(51) Int. Cl.
*B01J 23/40*    (2006.01)
*B01J 23/42*    (2006.01)
(Continued)

(52) U.S. Cl.
CPC .............. *B01J 23/8913* (2013.01); *B01J 21/04* (2013.01); *B01J 35/002* (2013.01); *B01J 35/1019* (2013.01); *B01J 35/1038* (2013.01); *B01J 35/1061* (2013.01); *B01J 37/0205* (2013.01); *B01J 37/0242* (2013.01);
(Continued)

(58) Field of Classification Search
CPC ...... B01J 23/8913; B01J 21/04; B01J 35/002; B01J 35/1019; B01J 35/1038; B01J 35/1061; B01J 37/0205; B01J 37/0242; B01J 37/0244; B01J 37/08; C10G 2/00
USPC ................ 502/327; 423/437.1, 564; 518/700; 568/579; 585/899
See application file for complete search history.

(56) References Cited

U.S. PATENT DOCUMENTS

2011/0230572 A1*    9/2011    Allison .................. B01J 21/005
                                                              518/700

FOREIGN PATENT DOCUMENTS

| EP | 1 042 067 B1 | 10/2000 |
| WO | 97/00231 A1 | 1/1997 |
| WO | 99/34917 A1 | 7/1999 |

OTHER PUBLICATIONS

D.S. Maciver, et al; "Catalytic Aluminas I. Surface Chemistry of Eta and Gamma Alumina", Journal of Catalysis, vol. 2, Issue 6, pp. 485-497, Dec. 1963.

*Primary Examiner* — Colleen Dunn
*Assistant Examiner* — Haytham Soliman
(74) *Attorney, Agent, or Firm* — Ladas & Parry LLP

(57) ABSTRACT

The present invention relates to a method for preparing a cobalt-based catalyst for Fischer-Tropsch synthesis, more particularly to a method for preparing a cobalt-based catalyst represented by Ir—Co/η-Al$_2$O$_3$ wherein cobalt and iridium are supported at high density by repeating impregnation and drying tens of times on a spherical η-alumina support having many acidic sites.

The catalyst prepared according to the present invention can provide improved conversion rate of carbon monoxide and selectivity for liquid hydrocarbons when used for Fischer-Tropsch synthesis.

8 Claims, 13 Drawing Sheets

(51) Int. Cl.
  *B01J 23/89* (2006.01)
  *B01J 37/02* (2006.01)
  *B01J 37/08* (2006.01)
  *B01J 21/04* (2006.01)
  *B01J 35/00* (2006.01)
  *B01J 35/10* (2006.01)
  *C10G 2/00* (2006.01)

(52) U.S. Cl.
  CPC ............ *B01J 37/0244* (2013.01); *B01J 37/08* (2013.01); *C10G 2/00* (2013.01)

Nitrogen sintering

PROCESS FOR PREPARING COBALT BASED CATALYSTS FOR FISCHER-TROPSCH SYNTHESIS

CROSS-REFERENCE TO RELATED APPLICATIONS

This application claims priority under 35 U.S.C. §119 to Korean Patent Application No. 10-2013-0057994, filed on May 22, 2013, in the Korean Intellectual Property Office, the disclosure of which is incorporated herein by reference in its entirety.

BACKGROUND (a) Technical Field

The present invention relates to a method for preparing a cobalt-based catalyst used for Fischer-Tropsch synthesis.

(b) Background Art

Natural gas has been drawing much attention as an alternative source of energy that can reduce dependency on petroleum. Natural gas is highly evaluated as an alternative to petroleum in that it is distributed relatively uniformly worldwide, its reserves is about 1.6 times that of petroleum with 67 years and it is a clean fuel that hardly produces pollutants such as sulfur and nitrogen compounds. However, natural gas is disadvantageous in that large-scale investment is for pipelines or natural gas liquefying facilities to transport it from production sites to consumers. In addition, in order to ensure economic feasibility, the reserve should be above a certain level and securing of a market is necessary. The gas to liquids (GTL) process is expected to overcome these limitations and facilitate economical utilization of natural gas.

The traditional GTL process converts natural gas to liquid fuels or chemicals via synthesis gas and consists of three major reactions—reforming of natural gas, Fischer-Tropsch (FT) synthesis and cracking of wax in products. In particular, the FT synthesis of preparing liquid hydrocarbons from the synthesis gas is the heart of the GTL process. The FT synthesis allows effective production of various hydrocarbon fuels and highly value-added chemicals from the synthesis gas and is drawing a lot of attention in the energy-related industry. Since the FT synthesis allows production of various types of petroleum products through process improvement or change in reaction conditions including catalysts, production can be varied flexibly depending on market circumstances.

Various catalysts for FT synthesis have been developed up to the present. Their catalytic activity is of great importance since it is directly related to productivity. The catalysts used for the FT synthesis mainly use metals such as palladium, nickel, iron, cobalt, etc. as active component. In particular, iron and cobalt are the active component of commercially available catalysts. Recently, a cobalt-based catalyst including zirconium, titanium, chromium, vanadium or manganese as cocatalyst was developed [International Patent Publication Nos. WO 1997/00231 and WO 1999/34917; European Patent No. 1,042,067]. However, improvement in the catalytic activity can be achieved only when the additionally included cocatalyst metal is closely bound to the cobalt active component.

The inventors of the present invention have studied to develop a method for preparing a cobalt-based catalyst for FT synthesis containing iridium (Ir) wherein cobalt and iridium can be closely bound.

SUMMARY

The present invention is directed to providing a method for preparing a cobalt-based catalyst wherein cobalt (Co) and iridium (Ir) are closely bound to a spherical η-alumina support, wherein the further supported iridium cocatalyst enhances spillover thus further improving the reducibility of cobalt and, ultimately, exhibiting superior catalytic activity in Fischer-Tropsch synthesis.

In an aspect, the present invention provides a method for preparing a cobalt-based catalyst for Fischer-Tropsch synthesis, including:

1) preparing an alumina sol by adding an organic binder and a dispersant to an aluminum precursor solution and stirring at 50-90° C. and at pH 3-6 and then converting the alumina sol to an alumina gel by heating at 50-90° C.;

2) preparing an η-alumina support by drying the alumina gel at 150-230° C., forming into spheres and sintering under nitrogen flow;

3) preparing Co/η-alumina by repeating a procedure of impregnating the η-alumina support in a cobalt precursor solution and drying at 50-100° C. 10-20 times to support cobalt on the η-alumina support and sintering same under air flow; and 4) preparing a cobalt-based catalyst represented by Chemical Formula 1 by impregnating the Co/η-alumina in an iridium precursor solution to support iridium on the Co/η-alumina and sintering same under air flow:

[Chemical Formula 1]

wherein a and b are supporting amounts of iridium (Ir) and cobalt (Co) based on the weight of the η-alumina support, with a being 0.01-5 wt % and b being 0.1-30 wt %.

Other features and aspects of the present invention will be apparent from the following detailed description, drawings and claims.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

Figure 1A:
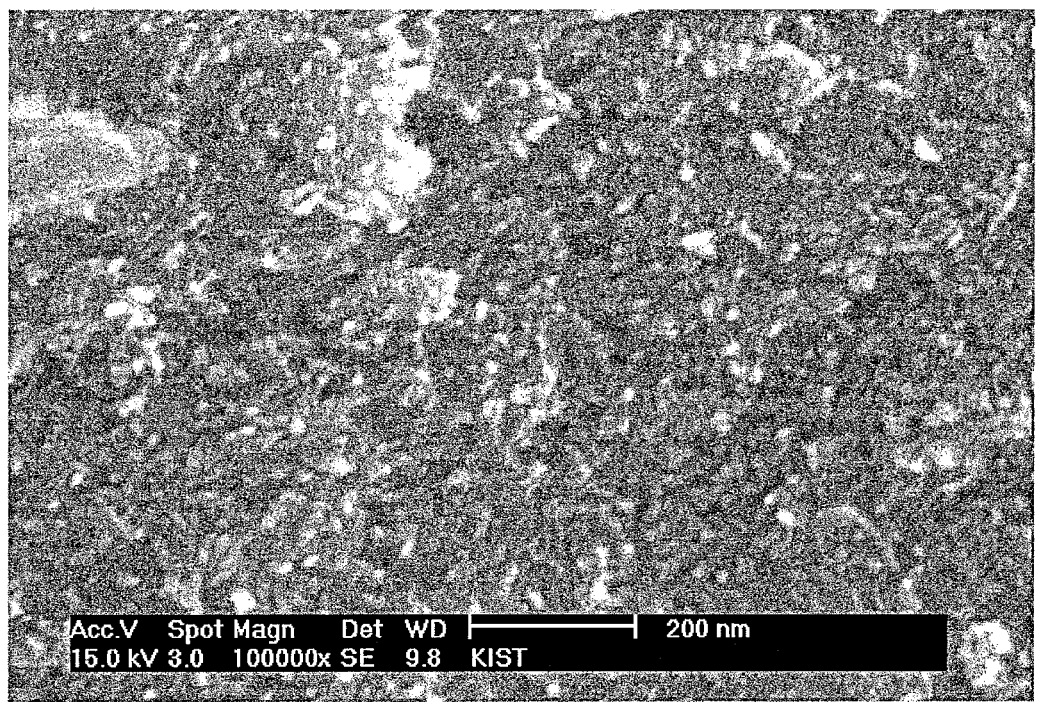
FIG. 1A shows a scanning electron microscopic (SEM) image of the surface of an alumina support prepared by nitrogen sintering (Preparation Example 1)

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a method for preparing a cobalt-based catalyst for Fischer-Tropsch synthesis wherein cobalt as an active component and iridium as a cocatalyst metal are supported on an η-alumina support.

In general, spillover occurs when the activity of the main catalyst metal is improved by further supporting a cocatalyst metal, which facilitates adsorption of hydrogen to the active metal and enhances reducibility of cobalt. The present invention aims at enhancing catalytic activity by further enhancing the spillover phenomenon using a specifically selected support.

Alumina ($Al_2O_3$) is a well-known catalyst support. Alumina may exist in various crystal phases depending on the preparation method, including $\alpha$, $\beta$, $\gamma$ and $\eta$ phases. Each crystal phase is known to exhibit unique properties. Accordingly, although alumina is commonly used as a support, it is very important to select an alumina having a crystal structure suitable for the corresponding reaction system.

For example, γ-alumina, which has few acidic sites and whose surface has boehmite characteristics, facilitates oxidation of the active metal. In Fischer-Tropsch synthesis, the catalytic activity may be enhanced through reduction of the active metal. Accordingly, use of γ-alumina as the support may lead to catalyst deactivation or degradation of thermal stability of the catalyst due to facilitated oxidation of the active metal. Thus, in the present invention, η-alumina having many acidic sites is selected as a support of a cobalt-based catalyst for Fischer-Tropsch synthesis. η-Alumina is known to have more acidic sites than alumina of other crystal phases [*J. Catalysis*, 1963, 2, 485-497]. With many acidic sites, the η-alumina enhances spillover when a cocatalyst is supported, thus facilitating reduction of cobalt and exhibiting catalytic action in Fischer-Tropsch synthesis.

Another feature of the present invention is that cobalt is supported on the η-alumina by impregnation. A procedure of impregnating the η-alumina support in a cobalt precursor solution and then drying is repeated tens of times, such that cobalt is dispersed deeply and uniformly in the pores of the support. Further, in the present invention, an iridium cocatalyst may be supported on the Co/η-alumina by carrying out a procedure of impregnating the Co/η-alumina in an iridium precursor solution and then drying once or repeating the procedure tens of times. If iridium is supported on the Co/η-alumina by repeating impregnation and drying tens of times, the iridium can be more uniformly dispersed on and more firmly bound to the Co/η-alumina.

Another feature of the present invention is that η-alumina is formed into spheres for use as the support. Catalysts may be formed into shapes of sphere, pellet, ring, star, etc. The shape greatly affects the properties and stability of the catalyst. In the present invention, η-alumina formed into spheres is used as a support in consideration of the strength and stability of the catalyst.

Hereinafter, the respective steps of the method for preparing a cobalt-based catalyst for Fischer-Tropsch synthesis according to the present invention will be described in detail.

In step 1, an alumina gel is prepared using an aluminum precursor.

Specifically, an organic binder and a dispersant are added to an aluminum precursor solution and stirred at 50-90° C. and at pH 3-6 to prepare an alumina sol, which is then converted to an alumina gel by heating at 50-90° C. The aluminum precursor may be a compound commonly used in the field of catalyst synthesis for preparation of an alumina support. In the present invention, selection of the compound is not particularly limited. For example, one or more compound selected from aluminum nitrate, aluminum iodide, aluminum bromide, aluminum chloride, aluminum acetate, etc. may be used as the aluminum precursor.

In the present invention, a mesoporous support having medium-sized pores can be prepared by inducing porosification during alumina sol-gel formation using an organic binder and a dispersant. The organic binder may be selected from a group consisting of polyvinyl alcohol (PVA), polyvinylpyrrolidone (PVP), polyvinylidene fluoride (PVDF), etc. The dispersant may be selected from a group consisting of urea, melanin and polyisocyanate. Each of the organic binder and the dispersant may be used in an amount of 0.01-5 wt % based on the aluminum precursor.

In step 2, the alumina gel is dried, formed and sintered to prepare an η-alumina support.

Specifically, the alumina gel prepared in step 1 is filtered, washed and dried at 150-230° C. for about 3-10 hours. The dried alumina gel is formed into spheres using an adequate apparatus. Then, the spherically formed alumina gel is degassed in vacuum state and sintered under nitrogen atmosphere by injecting nitrogen gas to prepare the η-alumina support. The condition of sintering the alumina gel is very important since the crystal structure of the support varies greatly depending on the sintering condition. In the present invention, the sintering is carried out under nitrogen flow to obtain the desired η-alumina support. As demonstrated through the following Preparation Examples and Comparative Preparation Examples, the crystal phase and surface characteristics of the prepared support vary depending on the alumina gel sintering condition. Another feature of the present invention is that the sintering is carried out under nitrogen flow with a specific temperature gradient so that the η-alumina is formed more favorably. That is to say, in the present invention, the η-alumina support may be prepared by heating the alumina gel at 120° C. for 1-5 hours under nitrogen flow, heating from 120° C. to 500° C. at a heating rate of 3-10° C./min and heating at 500° C. for 1-5 hours.

In step 3, a cobalt active component is supported on the η-alumina support to prepare Co/η-alumina.

Specifically, a procedure of impregnating the η-alumina support prepared in step 2 in a cobalt precursor solution and drying at 50-100° C. is repeated 10-20 times to support cobalt on the η-alumina support, which is then sintered under air flow to prepare the Co/η-alumina. That is to say, in the present invention, the procedure of impregnating and drying is repeated 10-20 times to support the cobalt active component on the support with high density. Specifically, a ratio of the volume of the cobalt precursor solution used for the impregnation to the pore volume of the η-alumina support may be 1:0.5-1.0. If the volume of the cobalt precursor solution is smaller, the precursor may be densely impregnated. And, if the volume of the cobalt precursor solution is larger, the precursor may not be impregnated effectively. As demonstrated through the following Preparation Examples and Comparative Preparation Examples, catalytic activity varies greatly depending on the supporting method of the cobalt active component.

After the cobalt active component is supported, sintering is carried out under air flow at 300-600° C., specifically at 400-600° C., for 5-10 hours flow to prepare the Co/η-alumina. Specifically, the cobalt may be supported in an amount of 0.1-30 wt % based on the weight of the η-alumina support. The cobalt precursor used to support the cobalt may be a compound commonly used in the field of catalyst synthesis for preparation. In the present invention, selection of the compound is not particularly limited. For example, one or more compound selected from cobalt nitrate, cobalt bromide, cobalt chloride, cobalt acetate, cobalt iodide, etc. may be used as the cobalt precursor.

In step 4, an iridium cocatalyst is supported on the Co/η-alumina to prepare Ir—Co/η-alumina.

Specifically, the Co/η-alumina prepared in step 3 is impregnated in an iridium precursor solution and dried at 50-100° C. to support iridium on the Co/η-alumina, which is then sintered under air flow to prepare an Ir—Co/η-alumina catalyst. The supporting of the iridium cocatalyst in step 4 may be achieved sufficiently by carrying out the procedure of impregnating drying once. But, specifically, the procedure of impregnating drying may be carried out 10-20 times as in step 3 such that iridium can be supported on the Co/η-alumina with high density. Different iridium precursor solutions may be used depending on whether the supporting is performed once or repeatedly. When the iridium is supported by carrying out the procedure of impregnating drying once, the iridium precursor solution may be prepared by dissolving an iridium precursor in distilled water with a volume ratio of 1:2-3 based on the apparent volume of the η-alumina support such that the support is sufficiently immersed. And, when the iridium is supported by repeating the procedure of impregnating drying as in step 3, the iridium precursor solution may be prepared by dissolving an iridium precursor in distilled water with a volume ratio of 1:0.5-1.0 based on the pore volume of the η-alumina support.

After the iridium is supported, the support is sintered under air flow at 300-600° C., specifically at 300-500° C., for 5-10 hours as in step 3 to prepare a Co—Ir/η-alumina catalyst desired by the present invention. Specifically, the iridium may be supported in an amount of 0.01-5 wt % based on the weight of the η-alumina support. The iridium precursor used to support the iridium may be a compound commonly used in the field of catalyst synthesis for preparation. In the present invention, selection of the compound is not particularly limited. For example, one or more compound selected from iridium(III) chloride hydrate, iridium chloride, iridium iodide, iridium(IV) chloride hydrate, dihydrogen hexachloroiridate(IV) hydrate, ammonium hexachloroiridate(IV), sodium hexachloroiridate(IV) hexahydrate, potassium hexachloroiridate(IV), iridium black, etc. may be used as the iridium precursor.

EXAMPLES

The present invention will be described in more detail through preparation examples and examples. The following preparation examples and examples are for illustrative purposes only and it will be apparent to those skilled in the art not that the scope of this invention is not limited by the preparation examples and examples.

Preparation Example

Preparation of Alumina Support

Preparation Example 1

Preparation of Alumina Support (Nitrogen Sintering)

An aluminum precursor solution was prepared by adding 60 g of aluminum nitrate ($Al(NO_3)_3 \cdot 9H_2O$) to 60 mL of ethanol and stirring at room temperature for about 3 hours. 6 g of polyvinyl alcohol and 6 g of urea were respectively dissolved in 6 mL of ethanol. The two solutions were mixed with the aluminum precursor solution, stirred at 80° C. for about 24 hours and adjusted to pH 5 to obtain an alumina sol. The alumina sol was converted to an alumina gel by further heating 80° C. for about 24 hours. The alumina gel was filtered, washed, dried at 200° C. for about 6 hours and formed into spheres. A quartz sinterer was used to sinter the alumina gel. Moisture and air included in the sinterer were exhausted using a vacuum pump. The spherical alumina gel was put in the quartz sinterer and nitrogen gas was flown at a rate of 200 mL/min using a mass flow controller (MFC) while maintaining atmospheric pressure. The temperature of the sinterer was raised from room temperature to 120° C. at a rate of 5° C./min and then maintained at 120° C. for 3 hours. Subsequently, sintering was performed while raising temperature from 120° C. to 500° C. at a rate of 5° C./min while flowing nitrogen gas at 100 mL/min and then maintaining temperature at 500° C. for 12 hours. The preparation of η-alumina could be confirmed by XRD analysis.

Comparative Preparation Example 1

Preparation of Alumina Support (Air Sintering)

An alumina gel was prepared in the same manner as in Preparation Example 1. The prepared alumina gel was filtered, washed, dried at about 200° C. for about 6 hours and formed into spheres. A quartz sinterer was used to sinter the alumina gel. Moisture and air included in the sinterer were exhausted using a vacuum pump. The spherical alumina gel was put in the quartz sinterer and air was flown at a rate of 200 mL/min using a mass flow controller (MFC) while maintaining atmospheric pressure. The temperature of the sinterer was raised from room temperature to 120° C. at a rate of 5° C./min and then maintained at 120° C. for 3 hours. Subsequently, sintering was performed while raising temperature from 120° C. to 500° C. at a rate of 5° C./min while flowing air at 100 mL/min and then maintaining temperature at 500° C. for 12 hours. A small amount of η-alumina included in η-alumina could be confirmed by XRD analysis. The alumina support prepared by air sintering is called γ-alumina ($\gamma\text{-}Al_2O_3$).

Figure 1B:
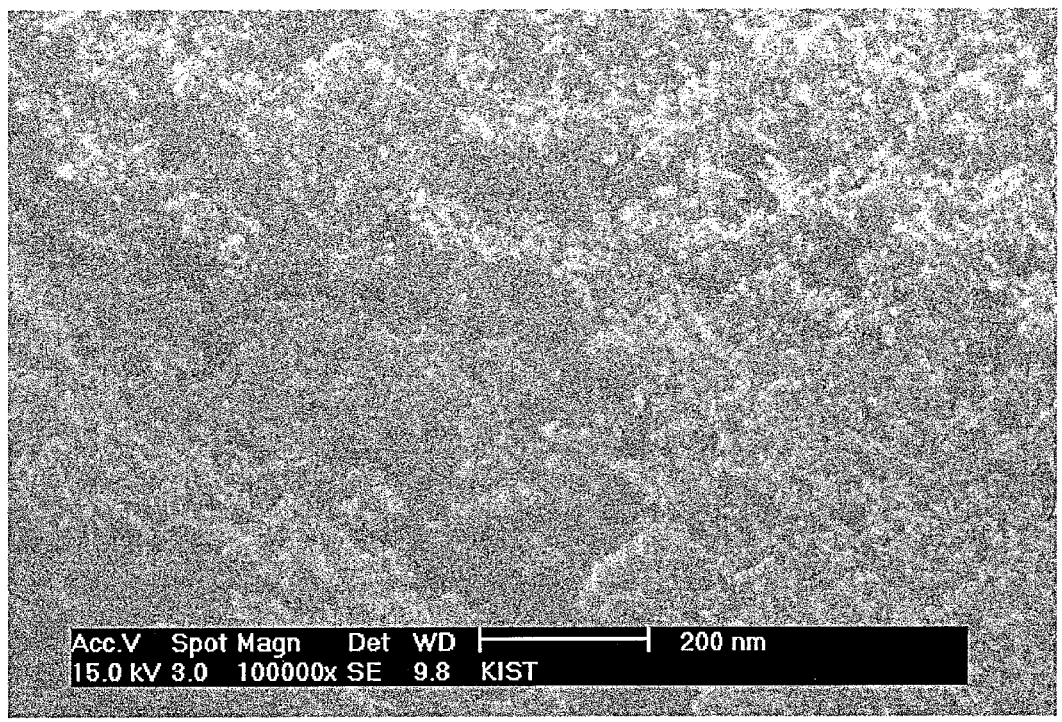
FIG. 1B shows an SEM image of the surface of an alumina support prepared by air sintering (Comparative Preparation Example 1)

FIG. 1 shows scanning electron microscopic (SEM) images of the surface of the alumina supports prepared by nitrogen sintering (Preparation Example 1) and air sintering (Comparative Preparation Example 1). Referring to FIG. 1, pores are formed uniformly in the support particles prepared in Preparation Example 1 and Comparative Preparation Example 1 using the organic binder and the dispersant.

Figure 2A:
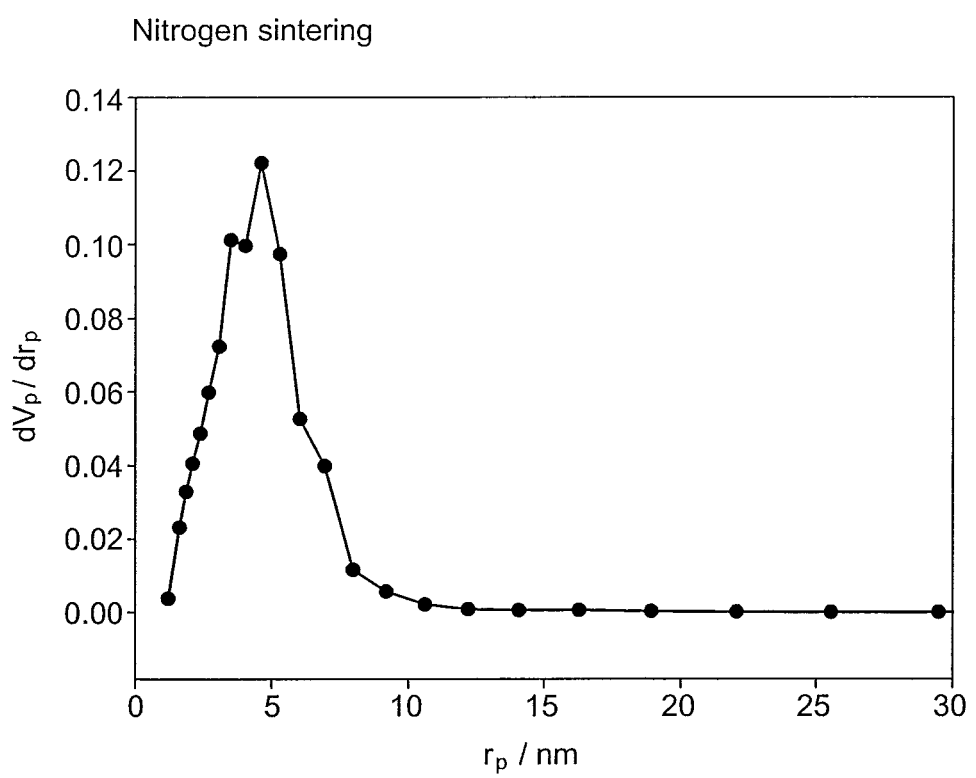
FIG. 2A shows a result of analyzing pore characteristics of an alumina support prepared by nitrogen sintering (Preparation Example 1) by the Barrett-Joyner-Halenda (BJH) method.
Figure 2B:
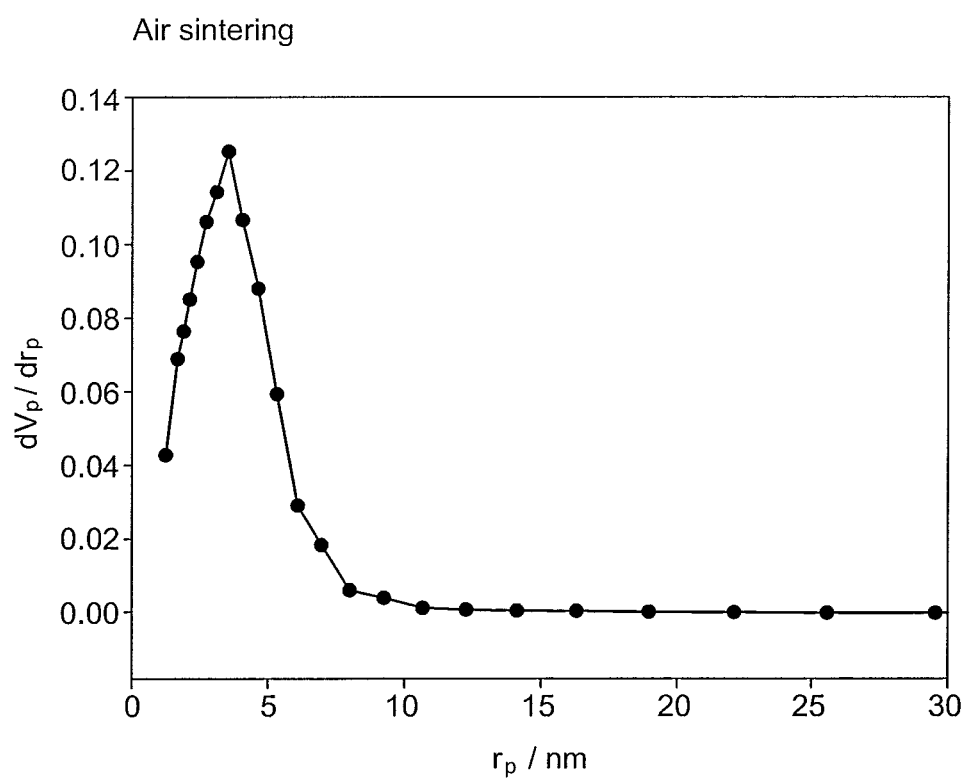
FIG. 2B shows a result of analyzing pore characteristics of an alumina support prepared by air sintering (Comparative Preparation Example 1) by the BJH method.

FIG. 2 shows a result of analyzing pore characteristics of the alumina supports prepared by nitrogen sintering (Preparation Example 1) and air sintering (Comparative Preparation Example 1) by the Barrett-Joyner-Halenda (BJH) method. Referring to FIG. 2, the two catalysts wherein porosification was induced using PVA as the organic binder and urea as the dispersant during alumina sol-gel formation show similar pore distributions.

Figure 3:
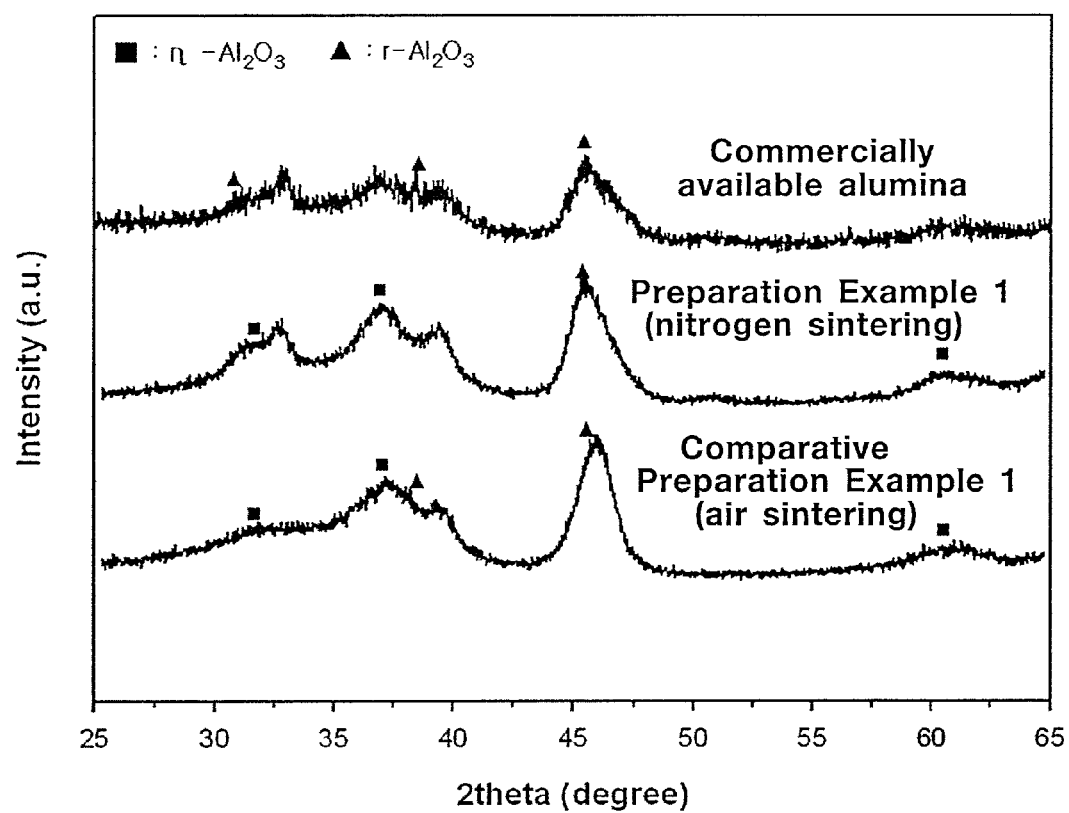
FIG. 3 shows a result of analyzing X-ray diffraction patterns of an alumina support prepared by nitrogen sintering (Preparation Example 1) or air sintering (Comparative Preparation Example 1) and a commercially available alumina support.
Figure 4:
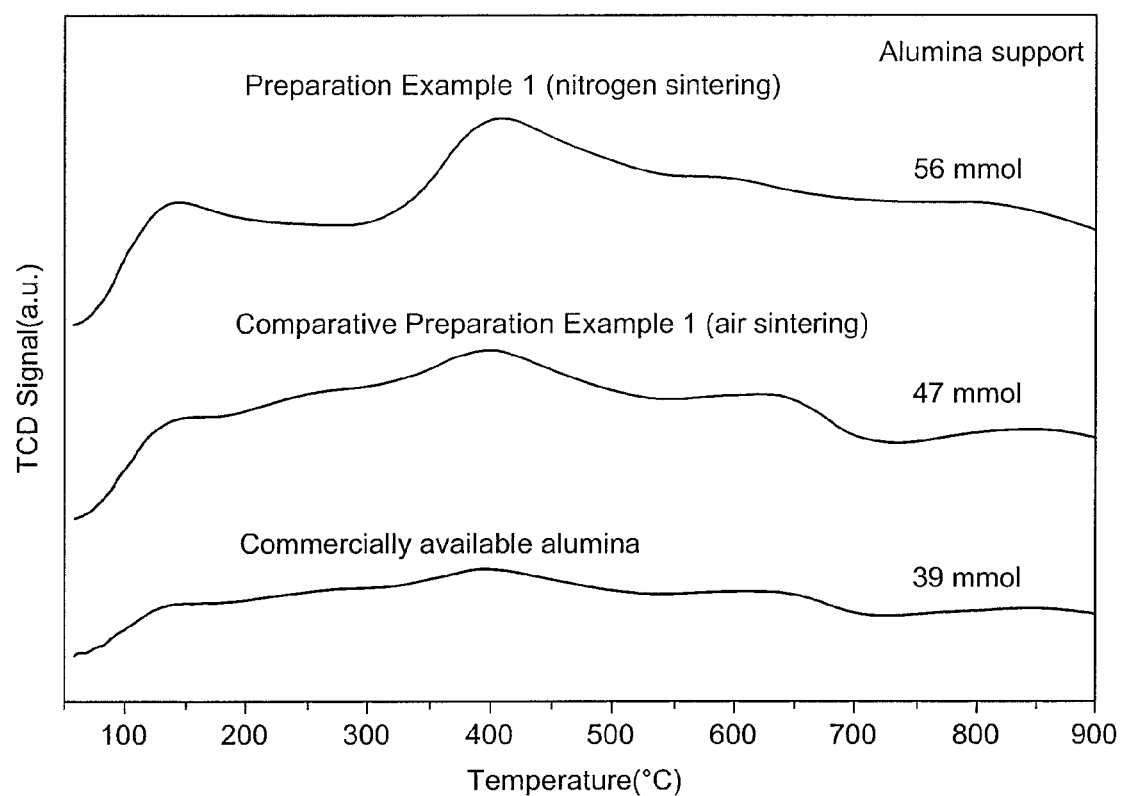
FIG. 4 shows an $NH_3$-TPD analysis result of analyzing acidic sites of an alumina support prepared by nitrogen sintering (Preparation Example 1) or air sintering (Comparative Preparation Example 1) and a commercially available alumina support.
Figure 5A:
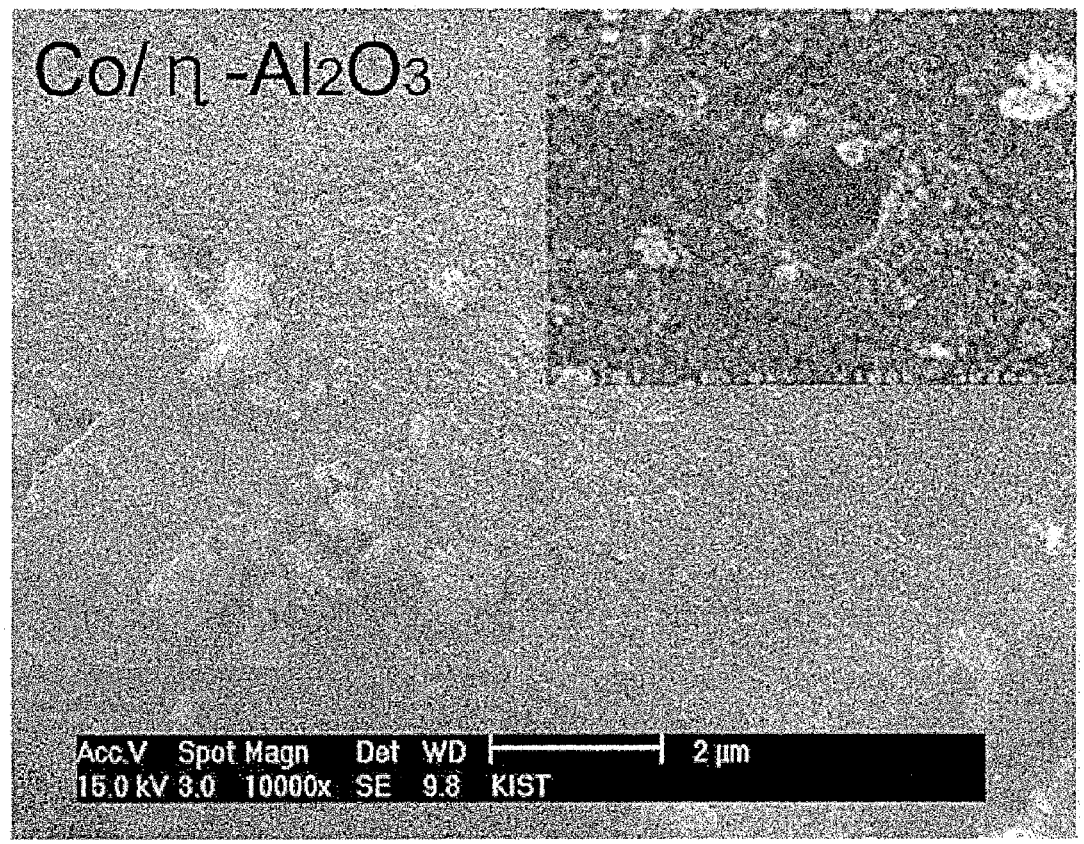
FIG. 5A shows an SEM image of the surface of a catalyst prepared in 1) of Example 1.
Figure 5B:
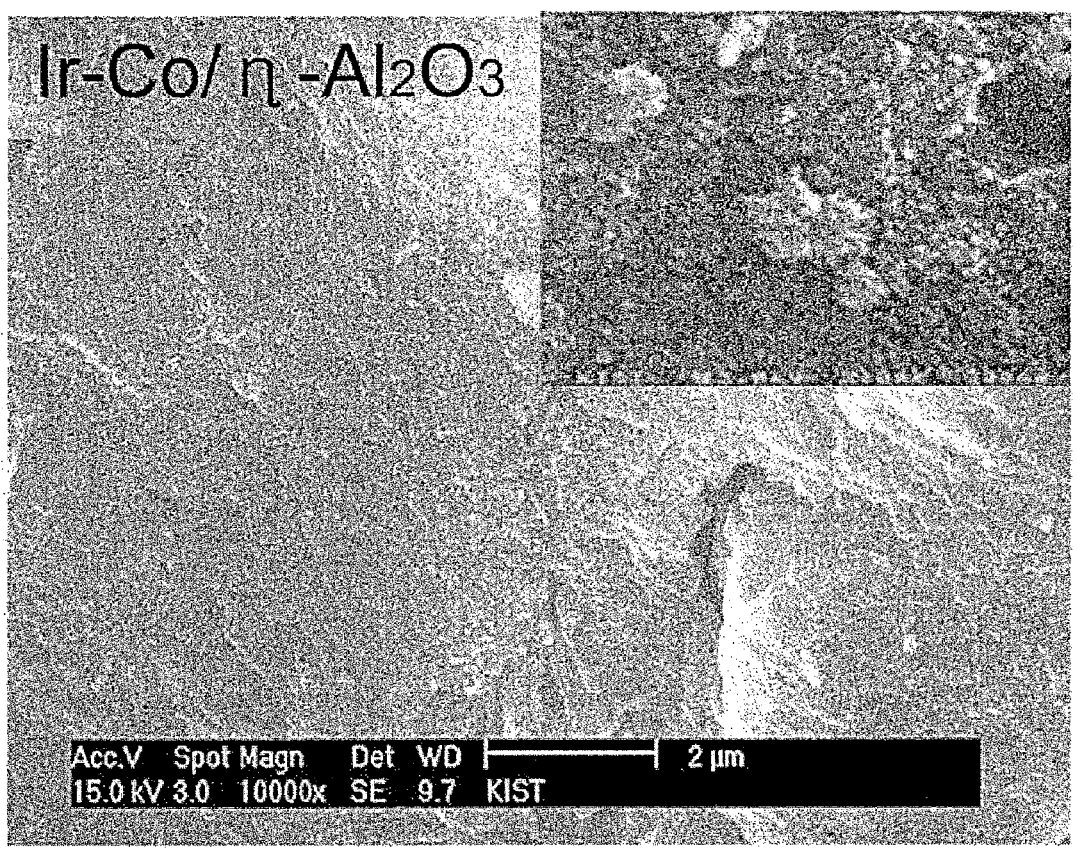
FIG. 5B shows an SEM image of the surface of a catalyst prepared in 2) of Example 1.
Figure 5C:
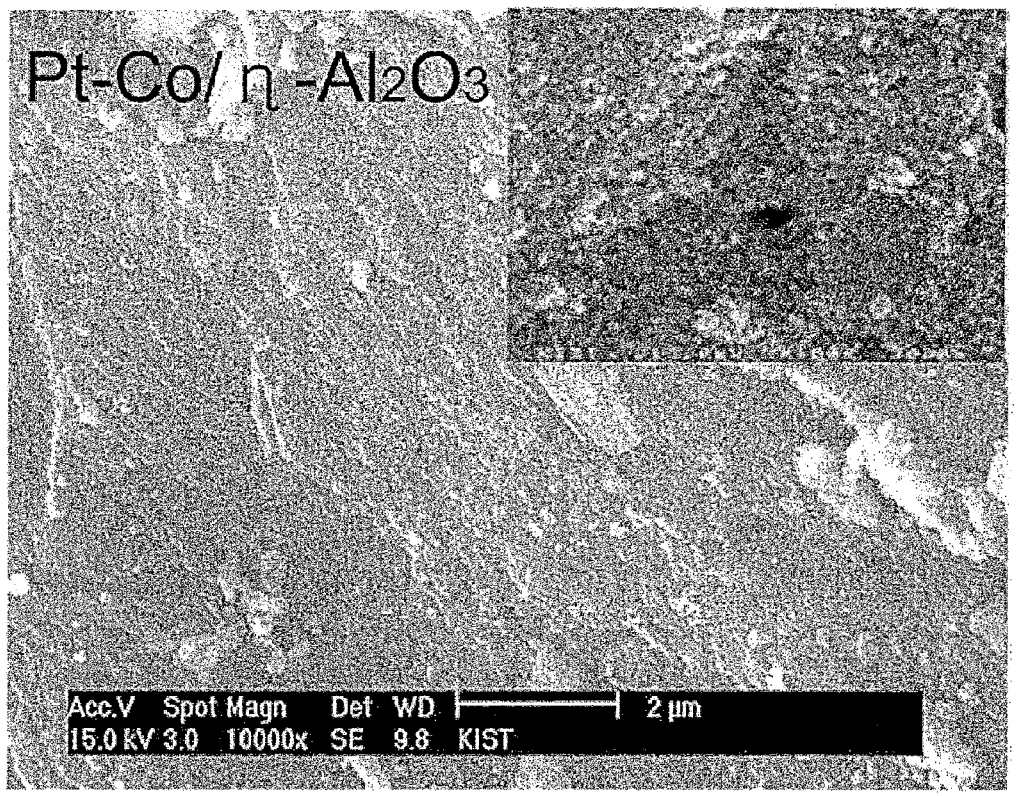
FIG. 5C shows an SEM image of the surface of a catalyst prepared in Comparative Example 1.
Figure 5D:
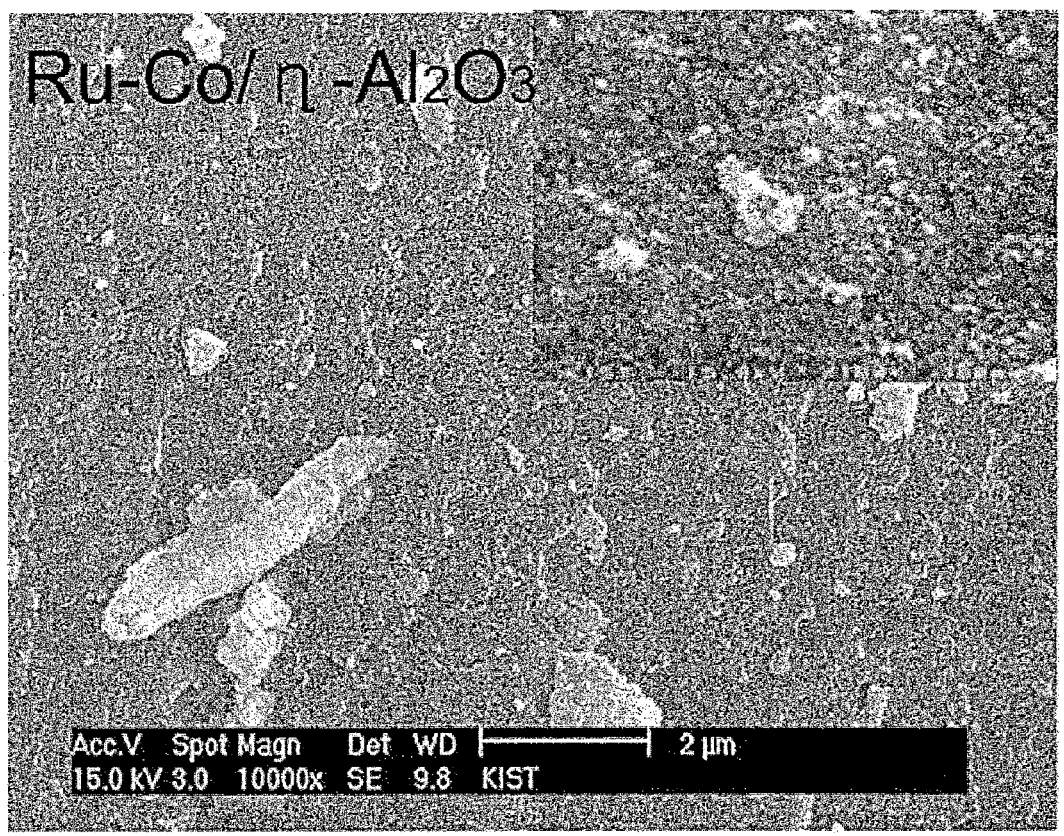
FIG. 5D shows an SEM image of the surface of a catalyst prepared in Comparative Example 2.

FIG. 3 and FIG. 4 show a result of comparing the crystal structure and acidic sites of the alumina supports prepared in Preparation Example 1 (nitrogen sintering) and Comparative Preparation Example 1 (air sintering) and a commercially available alumina support. The commercially available alumina support was γ-alumina commercially available from Aldrich as 521752 and was used after removing impurities and moisture included in the alumina by sintering at 200° C. for 24 hours.

The X-ray diffraction analysis result in FIG. 3 reveals that the alumina supports prepared in Preparation Example 1 and Comparative Preparation Example 1 have different crystal structures. Although Preparation Example 1 and Comparative Preparation Example 1 are different only in the sintering condition, the support of Preparation Example 1 is relatively richer in η-alumina and the support of Comparative Preparation Example 1 is relatively richer in γ-alumina.

From the $NH_3$-TPD analysis result in FIG. 4, the acidic sites can be compared at three temperature zones. The amount of weakly acidic sites, moderately acidic sites and strongly acidic sites can be estimated at low temperatures around 200° C., moderate temperatures around 400° C. and high temperatures around 700° C., respectively. The alumina support of Preparation Example 1 shows definitely more weakly acidic sites and moderately acidic sites than the other supports and also shows significantly increased strongly acidic sites. The adsorption amount of ammonia was in the order of Preparation Example 1>Comparative Preparation Example 1>commercially available alumina. Accordingly, it was confirmed that the support of Preparation Example 1, which is rich in η-alumina, has more acidic sites as compared to the alumina of Comparative Preparation Example 1 or the commercially available alumina.

A result of investigating physisorption properties of the alumina supports prepared in Preparation Example 1 (nitrogen sintering) and Comparative Preparation Example 1 (air sintering) and the commercially available alumina support is shown in Table 1.

TABLE 1

| Alumina supports | $N_2$ physisorption | | |
| --- | --- | --- | --- |
| | Specific surface area (m²/g) | Total pore volume (cm³/g) | Average pore size (nm) |
| Preparation Example 1 (nitrogen sintering) | 247 | 0.46 | 7.5 |
| Comparative Preparation Example 1 (air sintering) | 172 | 0.44 | 10.3 |
| Commercially available alumina | 170 | 0.38 | 7.2 |

Examples

Preparation of Catalyst

Example 1

Preparation of $^3$Ir—$^{20}$Co/η-Alumina Catalyst (Repeated Drying and Impregnation)

1) Preparation of 20Co/η-Alumina (Repeated Drying and Impregnation)

2.5 g of the η-alumina support prepared in Preparation Example 1 was sintered at 200° C. for 24 hours to completely remove moisture included in the alumina support. 20 wt % of cobalt nitrate $(Co(NO_3)_2 \cdot 6H_2O)$ based on the weight of the alumina support was weighed, added to distilled water corresponding to the pore volume of the alumina support and stirred for 3 hours to prepare a cobalt precursor solution. The alumina support was impregnated in 0.1 mL of the cobalt precursor solution and the cobalt precursor solution was completely dried in a vacuum oven at 60° C. for about 1 hour. The procedure of impregnation and drying was repeated 15 times. Subsequently, a Co/η-alumina catalyst was prepared by drying the alumina support in a vacuum oven at 80° C. for 24 hours and then sintering for 8 hours at 500° C. under atmospheric pressure and air atmosphere.

2) Preparation of $^3$Ir—$^{20}$Co/η-Alumina (Repeated Drying and Impregnation)

2.5 g of the Co/η-alumina prepared in 1) of Example 1 was sintered at 200° C. for 24 hours to completely remove moisture included in the alumina. 3 wt % of iridium chloride $(IrCl_3 \cdot xH_2O)$ based on the weight of the alumina support was weighed, added to distilled water corresponding to the pore volume of the alumina support and stirred for 3 hours to prepare an iridium precursor solution. The Co/η-alumina was impregnated in 0.1 mL of the iridium precursor solution and the iridium precursor solution was completely dried in a vacuum oven at 60° C. for about 1 hour. The procedure of impregnation and drying was repeated 15 times. Subsequently, a $^3$Ir—$^{20}$Co/η-alumina catalyst was prepared by drying the alumina in a vacuum oven at 80° C. for 24 hours and then sintering for 8 hours at 500° C. under atmospheric pressure and air atmosphere.

Example 2

Preparation of $^1$Ir—$^{20}$Co/η-Alumina (Repeated Drying and Impregnation)

A $^1$Ir—$^{20}$Co/η-alumina catalyst was prepared in the same manner as in Example 1, except for using 1 wt % of iridium chloride $(IrCl_3 \cdot xH_2O)$ based on the weight of the alumina support.

Example 3

Preparation of $^{0.1}$Ir—$^{20}$Co/η-Alumina (Repeated Drying and Impregnation)

A $^{0.1}$Ir—$^{20}$Co/η-alumina catalyst was prepared in the same manner as in Example 1, except for using 0.1 wt % of iridium chloride (IrCl$_3$.xH$_2$O) based on the weight of the alumina support.

Comparative Example 1

Preparation of $^3$Pt—$^{20}$Co/η-Alumina (Repeated Drying and Impregnation)

A $^3$Pt—$^{20}$Co/η-alumina catalyst was prepared in the same manner as in Example 1, except for using platinum (Pt) as the cocatalyst instead of iridium (Ir).

Comparative Example 2

Preparation of $^3$Ru—$^{20}$Co/η-Alumina (Repeated Drying and Impregnation)

A $^3$Ru—$^{20}$Co/η-alumina catalyst was prepared in the same manner as in Example 1, except for using ruthenium (Pt) as the cocatalyst instead of iridium (Ir).

Comparative Example 3

Preparation of $^3$Ir—$^{20}$Co/γ-Alumina (Repeated Drying and Impregnation)

A $^3$Ir—$^{20}$Co/γ-alumina catalyst was prepared in the same manner as in Example 1, except for using the alumina support prepared in Comparative Preparation Example 1 (air sintering) as the support.

Comparative Example 4

Preparation of $^3$Ir—$^{20}$Co/η-Alumina (General Impregnation)

A $^3$Ir—$^{20}$Co/η-alumina catalyst wherein cobalt and iridium are supported on the η-alumina support (Preparation Example 1) was prepared in the same manner as in Example 1, except for carrying out the procedure of impregnation and drying once in 1) of Example 1.

Specifically, 2.5 g of the η-alumina prepared in Preparation Example 1 was sintered at 200° C. for 24 hours to completely remove moisture included in the alumina. 20 wt % of cobalt nitrate(Co(NO$_3$)$_2$.H$_2$O) based on the weight of the alumina support was weighed and dissolved in distilled water corresponding to 2-3 times the apparent volume of the alumina support to prepare a cobalt precursor solution in which the support can be sufficiently immersed. The alumina support was impregnated in the prepared cobalt precursor solution and dried in a vacuum oven at 80° C. for about 24 hours. Subsequently, a Co/η-alumina catalyst was prepared by sintering for 8 hours at 500° C. under atmospheric pressure and air atmosphere.

Then, iridium was supported on the Co/η-alumina in the same manner as in 2) of Example 1.

Comparative Example 5

Preparation of $^3$Ir—$^{20}$Co/Commercially Available Alumina (Repeated Drying and Impregnation)

A $^3$Ir—$^{20}$Co/commercially available alumina catalyst was prepared in the same manner as in Example 1, except for using a commercially available alumina support (521752, Aldrich).

A result of investigating physisorption characteristics of the cobalt-based catalysts prepared in Examples 1-3 and Comparative Examples 1-5 is given in Table 2.

TABLE 2

| | | | XRD | | N$_2$ physisorption | | |
| --- | --- | --- | --- | --- | --- | --- | --- |
| Cobalt-based catalysts | | Supporting method | d (Co$_3$O$_4$) (nm) | d (Co$^0$) (nm) | Specific surface area (m$^2$/g) | Total pore volume (cm$^3$/g) | Average pore size (nm) |
| Example 1 | 20Co/η-Al$_2$O$_3$ | Repeated impregnation and drying | 10.5 | 8.0 | 190 | 0.38 | 6.8 |
| | $^3$Ir—$^{20}$Co/η-Al$_2$O$_3$ | Repeated impregnation and drying | 10.4 | 7.8 | 119 | 0.26 | 6.2 |
| Example 2 (1Ir—20Co/η-Al$_2$O$_3$) | | Repeated impregnation and drying | 9.3 | 7.0 | 128 | 0.31 | 6.5 |
| Example 3 ($^{0.1}$Ir—$^{20}$Co/η-Al$_2$O$_3$) | | Repeated impregnation and drying | 10.1 | 7.6 | 152 | 0.37 | 6.7 |
| Comparative Example 1 ($^3$Pt—$^{20}$Co/η-Al$_2$O$_3$) | | Repeated impregnation and drying | 11.4 | 8.3 | 118 | 0.25 | 5.9 |
| Comparative Example 2 ($^3$Ru—$^{20}$Co/η-Al$_2$O$_3$) | | Repeated impregnation and drying | 11.8 | 8.5 | 122 | 0.27 | 6.1 |
| Comparative Example 3 ($^3$Ir—$^{20}$Co/γ-Al$_2$O$_3$) | | Repeated impregnation and drying | 13.1 | 9.8 | 120 | 0.36 | 9.8 |
| Comparative Example 4 ($^3$Ir—$^{20}$Co/η-Al$_2$O$_3$) | | General impregnation | 20.9 | 15.7 | 108 | 0.35 | 9.5 |
| Comparative Example 5 ($^3$Ir—$^{20}$Co/commercially available Al$_2$O$_3$) | | Repeated impregnation and drying | 9.4 | 7.1 | 128 | 0.31 | 5.9 |

The binding between cobalt, iridium and alumina can be confirmed from the XRD analysis result given in Table 2. In Example 1, the Ir—Co/η-$Al_2O_3$ catalyst showed a slightly weaker cobalt oxide ($Co_3O_4$) peak as compared to the Co/η-$Al_2O_3$ catalyst, which may be attributed to a stronger binding between cobalt, iridium and alumina resulting from the further supporting of iridium (Ir) as well as enhanced dispersibility. In contrast, the Ir—Co/η-$Al_2O_3$ catalyst prepared in Comparative Example 4 by the general impregnation method 20 bar, a space velocity 3600 mL/g cat/hr and a $H_2$/CO molar ratio of 2. The reaction was carried out for 100 hours. The reaction product was analyzed qualitatively and quantitatively by gas chromatography using a Carbosphere column and an HP-5 column.

Hydrocarbon selectivity and selectivity for the liquid products of the Fischer-Tropsch synthesis gasoline, diesel and wax are summarized in Table 3.

TABLE 3

| Cobalt catalysts | | CO conversion rate (mol %) | Selectivity (wt %) | | | Selectivity for liquid products (%) | | |
|---|---|---|---|---|---|---|---|---|
| | | | $CH_4$ | $C_{2-4}$ | $C_5+$ | Gasoline ($C_{5-11}$) | Diesel ($C_{12-18}$) | Wax ($C_{19}+$) |
| Example 1 | Co/η-$Al_2O_3$ | 65.2 | 19.0 | 14.2 | 66.8 | 27.6 | 60.1 | 12.2 |
| | Ir—Co/η-$Al_2O_3$ | 74.2 | 14.7 | 11.2 | 74.1 | 15.8 | 80.9 | 5.3 |
| Comparative Example 1 (Pt—Co/η-$Al_2O_3$) | | 68.5 | 17.3 | 12.1 | 70.6 | 23.9 | 68.9 | 9.2 |
| Comparative Example 2 (Ru—Co/η-$Al_2O_3$) | | 65.7 | 18.5 | 15.3 | 66.2 | 24.2 | 62.5 | 13.3 |
| Comparative Example 3 (Ir—Co/γ-$Al_2O_3$) | | 66.8 | 17.5 | 13.8 | 68.7 | 24.8 | 54.5 | 20.7 |
| Comparative Example 4 (Ir—Co/η-$Al_2O_3$) | | 56.0 | 28.0 | 19.2 | 52.8 | 24.5 | 59.8 | 15.4 |
| Comparative Example 5 (Ir—Co/commercially available $Al_2O_3$) | | 65.5 | 18.7 | 13.8 | 67.5 | 26.7 | 51.6 | 23.7 | showed a remarkable stronger cobalt oxide ($Co_3O_4$) peak as compared to the Co/η-$Al_2O_3$ catalyst, which may be attributed to a weaker binding between cobalt, iridium and alumina. Also, as can be seen from the pore size in Table 2, the catalyst prepared in Comparative Example 4 by the general impregnation method showed increased average pore size as compared to the catalyst of Example 1 owing to pore blocking. Accordingly, it was confirmed that the η-alumina support wherein the cobalt active component is supported through repeated impregnation and drying according to the present invention exhibits uniform dispersion of the active component on the support and also enhanced spillover of iridium during supporting of the cobalt on the alumina support.

FIG. 5 shows SEM images of the surface of the catalysts prepared in 1) and 2) of Example 1, Comparative Example 1 and Comparative Example 2. FIG. 5 compares the surface of the catalysts prepared by further adding iridium (Ir), platinum (Pt) or ruthenium (Ru) as the cocatalyst. It can be seen that the iridium (Ir) cocatalyst was uniformly dispersed on the Co/η-$Al_2O_3$ which was prepared through repeated impregnation and drying, whereas platinum (Pt) or ruthenium (Ru) was not uniformly dispersed relatively.

Test Example

Fischer-Tropsch Synthesis

Fischer-Tropsch synthesis was carried out using the cobalt-based catalysts prepared in Examples 1-3 and Comparative Examples 1-5.

0.5 g of the cobalt-based catalyst was packed in a ⅜-inch stainless steel fixed-bed reactor and reduction pretreatment was performed for 12 hours at 450° C. by injecting hydrogen at 10 mL/min with a space velocity of 1200 mL/g cat/hr. Fischer-Tropsch synthesis was conducted under the condition of at a reaction temperature of 230° C., a reaction pressure of The activity of the cobalt-based catalysts wherein the cobalt active component and the cocatalyst are supported with the same amount for the Fischer-Tropsch synthesis is compared in Table 3.

It can be seen that the Ir—Co/η-$Al_2O_3$ catalyst of Example 1 exhibits the highest carbon monoxide conversion rate and the best diesel selectivity. In contrast, the Ir—Co/γ-$Al_2O_3$ catalyst of Comparative Example 3 wherein the alumina support prepared by air sintering (Comparative Preparation Example 1) was used shows slightly increase in conversion rate and diesel selectivity as compared to the catalyst of Comparative Example 5 (wherein the commercially available alumina support was used), but the activity is much lower than the catalyst of Example 1. The catalyst of Comparative Example 4 wherein the cobalt active component was supported by the general impregnation method shows low yield of liquid products with high methane ($CH_4$) selectivity, which may be attributed to the large size of the supported cobalt particles. Accordingly, it was confirmed that the cobalt-based catalyst prepared by supporting the cobalt active component through repeated impregnation and drying on the η-alumina support prepared by nitrogen sintering according to the present invention exhibits superior catalytic activity in Fischer-Tropsch synthesis.

Figure 6:
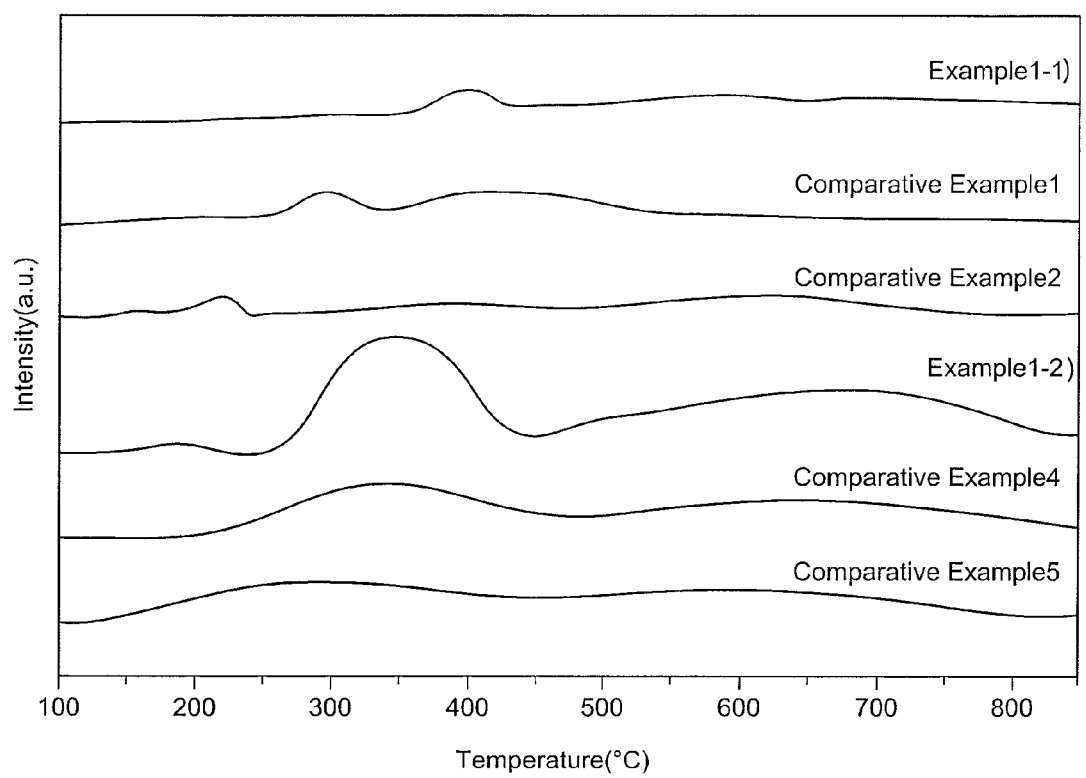
FIG. 6 shows a temperature-programmed reduction (TPR) analysis result of catalysts prepared in 1) and 2) of Example 1 and Comparative Examples 1, 2, 4 and 5.

FIG. 6 shows a temperature-programmed reduction (TPR) analysis result of the catalysts prepared in 1) and 2) of Example 1 and Comparative Examples 1, 2, 4 and 5. When reducibility of each catalyst was compared while raising temperature, the catalysts wherein iridium, platinum or ruthenium was further supported as the cocatalyst showed shift of reduction peaks toward lower temperature as compared to the Co/$Al_2O_3$ catalyst. In particular, the catalyst wherein ruthenium was supported showed distinct separation at around 200° C. ($RuO_2 \rightarrow Ru$), which may be due to the difference in interaction with the support and miscibility of cobalt as compared to the catalysts wherein iridium or platinum was supported as the cocatalyst. Although the catalyst wherein iridium was supported as the cocatalyst shows reducibility at relatively high reduction temperature, but it can be seen from the peak area that the reducibility is that of cobalt. Accordingly, it was confirmed that the support according to the present invention can lead to increased cobalt reducibility through enhanced spillover caused by the supporting of the cocatalyst on the η-alumina.

Figure 7:
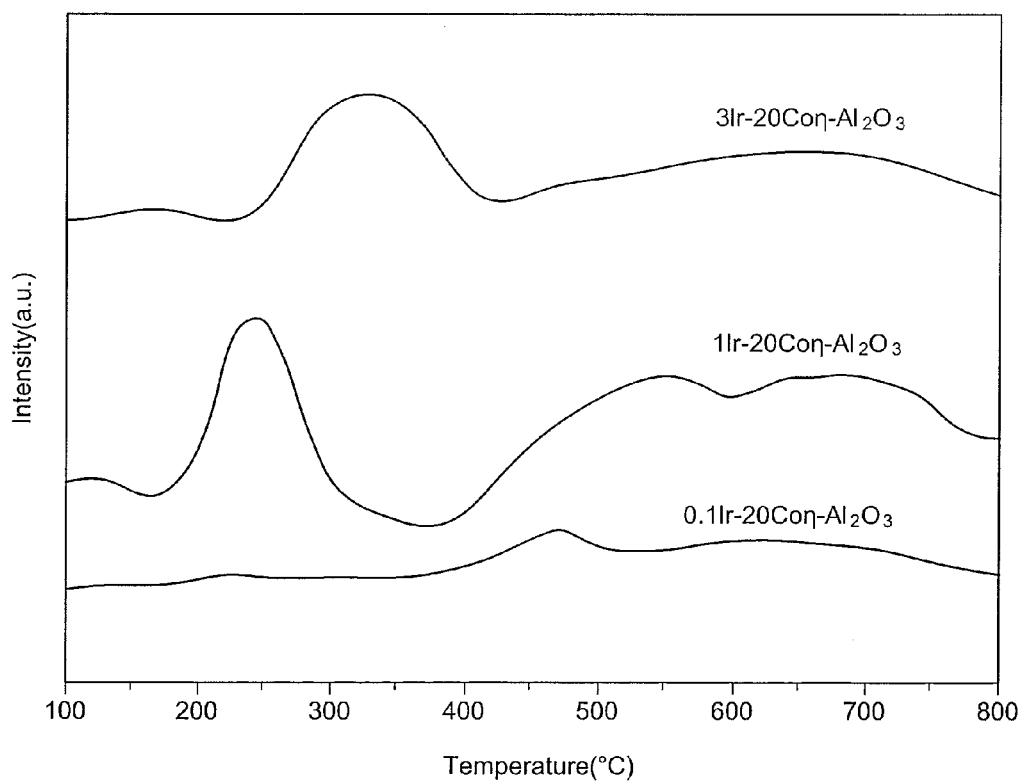
FIG. 7 shows a TPR analysis result of an Ir—Co/$Al_2O_3$ catalyst depending on the supporting amount of iridium.

FIG. 7 shows a TPR analysis result of the Ir—Co/Al$_2$O$_3$ catalyst depending on the supporting amount of iridium. It can be seen that the reduction temperature changes with the supporting amount of iridium, which may be due to the miscibility of iridium and cobalt. It can be seen that the best cobalt reduction effect can be attained when the supporting amount of iridium is 0.1-1 wt %.

Figure 8:
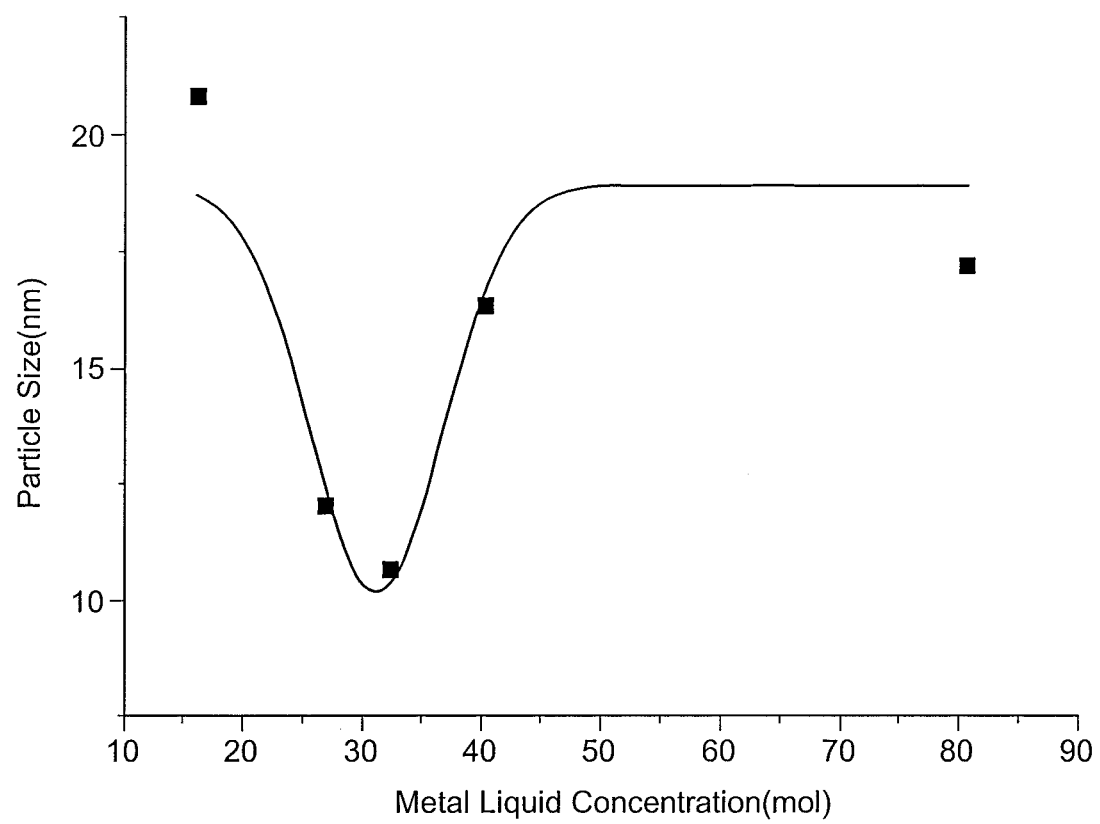
FIG. 8 shows particles size of a catalyst depending on the concentration of a precursor solution.

FIG. 8 shows the effect of the supporting of the active component through repeated impregnation and drying according to the present invention. Test was carried out for a '20 wt % Co/Al$_2$O$_3$ catalyst'. To prepare the catalyst, a cobalt precursor solution having a volume ratio of 1:0.25-2.5 based on the pore volume of an alumina support was prepared. It was confirmed that small particle size and improved catalyst dispersibility can be achieved when the alumina support is impregnated through repeated impregnation and drying using a precursor solution having a volume ratio of 1:1 based on the pore volume.

As described above, the cobalt-based catalyst prepared according to the present invention can provide improved catalytic activity for Fischer-Tropsch synthesis due to increased cobalt reducibility. Iridium was found to provide high selectivity for diesel among ecofriendly GTL fuels.

The cobalt-based catalyst according to the present invention may contribute to decrease in catalyst preparation cost since superior catalytic activity can be achieved even when the supporting amount of cobalt and iridium is minimized.

The cobalt-based catalyst according to the present invention, wherein cobalt and iridium are uniformly dispersed and supported on an η-alumina support having many acidic sites, can provide improved conversion rate of carbon monoxide and selectivity for liquid hydrocarbons when used for Fischer-Tropsch synthesis. In particular, the cobalt-based catalyst according to the present invention can contribute to increased production of ecofriendly diesel which is a liquid hydrocarbon fuel used for transportation.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a cobalt-based catalyst for Fischer-Tropsch synthesis, comprising:
   preparing an alumina sol by adding an organic binder and a dispersant to an aluminum precursor solution and stirring at 50-90° C. and at pH 3-6 and then converting the alumina sol to an alumina gel by heating at 50-90° C.;
   preparing an η-alumina support by drying the alumina gel at 150-230° C., forming into spheres and sintering under nitrogen flow;
   preparing Co/η-alumina by repeating a procedure of impregnating the η-alumina support in a cobalt precursor solution and drying at 50-100° C. 10-20 times to support cobalt on the η-alumina support and sintering same under air flow; and
   preparing a cobalt-based catalyst represented by Chemical Formula 1 by impregnating the Co/η-alumina in an iridium precursor solution to support iridium on the Co/η-alumina and sintering same under air flow:

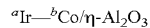   [Chemical Formula 1]

wherein a and b are supporting amounts of iridium (Ir) and cobalt (Co) based on the weight of the η-alumina support, with a being 0.01-5 wt % and b being 0.1-30 wt %.

2. The method for preparing a catalyst for Fischer-Tropsch synthesis according to claim 1, wherein the organic binder is selected from a group consisting of polyvinyl alcohol, polyvinylpyrrolidone and polyvinylidene fluoride and the dispersant is selected from a group consisting of urea, melanin and polyisocyanate.

3. The method for preparing a catalyst for Fischer-Tropsch synthesis according to claim 1, wherein each of the organic binder and the dispersant is used in an amount of 0.01-5 wt % based on the weight of the aluminum precursor.

4. The method for preparing a catalyst for Fischer-Tropsch synthesis according to claim 2, wherein each of the organic binder and the dispersant is used in an amount of 0.01-5 wt % based on the weight of the aluminum precursor.

5. The method for preparing a catalyst for Fischer-Tropsch synthesis according to claim 1, wherein the sintering in said preparing the η-alumina support comprises heating at 120° C. for 1-5 hours under nitrogen flow, heating from 120° C. to 500° C. at a heating rate of 3-10° C./min and heating at 500° C. for 1-5 hours.

6. The method for preparing a catalyst for Fischer-Tropsch synthesis according to claim 1, wherein a ratio of the volume of the cobalt precursor solution to a pore volume of the η-alumina support is 1:0.5-1.0.

7. The method for preparing a catalyst for Fischer-Tropsch synthesis according to claim 1, wherein said preparing the cobalt-based catalyst represented by Chemical Formula 1 comprises carrying out a procedure of impregnating the Co/η-alumina in an iridium precursor solution and drying same at 50-100° C. once or repeating the procedure 10-20 times.

8. The method for preparing a catalyst for Fischer-Tropsch synthesis according to claim 1, wherein the sintering in said preparing the Co/η-alumina and said preparing the cobalt-based catalyst represented by Chemical Formula 1 comprises heating at 300-600° C. for 5-10 hours under air flow.

* * * * *